US010399690B2

United States Patent
Ribarov et al.

(10) Patent No.: US 10,399,690 B2
(45) Date of Patent: Sep. 3, 2019

(54) ECOLOGY FUEL RETURN SYSTEMS

(71) Applicant: Hamilton Sundstrand Corporation, Charlotte, NC (US)

(72) Inventors: Lubomir A. Ribarov, West Hartford, CT (US); Kevin Gibbons, Torrington, CT (US); Charles E. Reuter, Granby, CT (US); Leo J. Veilleux, Jr., Wethersfield, CT (US); Richard J. Carpenter, Gales Ferry, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/235,522

(22) Filed: Aug. 12, 2016

(65) Prior Publication Data
US 2016/0349766 A1 Dec. 1, 2016

Related U.S. Application Data

(63) Continuation-in-part of application No. 14/340,275, filed on Jul. 24, 2014, now Pat. No. 9,624,835.

(51) Int. Cl.
*F16K 31/22* (2006.01)
*F02C 7/236* (2006.01)
(Continued)

(52) U.S. Cl.
CPC ............ *B64D 37/005* (2013.01); *B64D 37/02* (2013.01); *F02C 7/22* (2013.01); *F02C 7/236* (2013.01);
(Continued)

(58) Field of Classification Search
CPC . B64C 3/34; F02C 7/232; F02C 9/263; F16K 31/18; F16K 31/20; F16K 31/22;
(Continued)

(56) References Cited

U.S. PATENT DOCUMENTS 397,895 A   2/1889  Chase
628,581 A * 7/1899  Grosswyler ............. F16K 31/22
                                                137/433
(Continued)

FOREIGN PATENT DOCUMENTS

EP    0207198 A1    1/1987
GB     806742 A    12/1958

OTHER PUBLICATIONS

Extended European Search Report dated Dec. 14, 2015, issued on corresponding European Patent Application No. 15173904.2.

*Primary Examiner* — Seth W. Mackay-Smith
(74) *Attorney, Agent, or Firm* — Locke Lord LLP; Scott D. Wofsy; Alicia J. Carroll

(57) ABSTRACT

A shut-off valve system includes a tank having an inlet and an outlet with a flow path defined therebetween. A float within the tank occludes the tank outlet at a first fluid level under positive G forces and unoccludes the tank outlet at a second fluid level under positive G forces. A flow restricting orifice and/or a hydraulic fuse is downstream of float and tank outlet to restrict fluid communication between tank outlet and an ejector pump. A method for restricting flow in an ecology fuel return system includes recovering fuel from engine components, communicating the fuel to an inlet of a fuel tank, pumping the fuel from an outlet of fuel tank to an inlet of an engine when a float within tank unoccludes the outlet of the fuel tank, and restricting fluid flow from tank outlet to an ejector pump with a flow restricting orifice and/or a hydraulic fuse.

7 Claims, 6 Drawing Sheets

(51) Int. Cl.
  *B64D 37/00* (2006.01)
  *B64D 37/02* (2006.01)
  *F02C 7/22* (2006.01)

(52) U.S. Cl.
  CPC ....... *F05D 2300/507* (2013.01); *Y02T 50/671* (2013.01); *Y10T 137/0826* (2015.04); *Y10T 137/0898* (2015.04); *Y10T 137/7323* (2015.04); *Y10T 137/7436* (2015.04); *Y10T 137/7442* (2015.04)

(58) Field of Classification Search
  CPC ......... Y10T 137/0753; Y10T 137/0826; Y10T 137/0898; Y10T 137/7313; Y10T 137/7323; Y10T 137/7426; Y10T 137/7436; Y10T 137/7442
  USPC ...................................................... 244/135 R
  See application file for complete search history.

(56) References Cited

U.S. PATENT DOCUMENTS

| | | | | |
|---|---|---|---|---|
| 644,856 A * | 3/1900 | Gaa | ............ | F16K 31/22 137/398 |
| 654,016 A * | 7/1900 | Miller | ............ | B65B 1/36 137/433 |
| 670,893 A * | 3/1901 | Donnelly | ............ | F16T 1/24 122/14.1 |
| 678,077 A * | 7/1901 | Webb | ............ | F02M 1/00 137/433 |
| 747,514 A * | 12/1903 | Tozier | ............ | F22D 5/12 137/428 |
| 855,764 A * | 6/1907 | Gaylor | ............ | F23D 5/14 137/400 |
| 1,062,847 A * | 5/1913 | Park | ............ | F16K 31/22 137/151 |
| 1,236,096 A * | 8/1917 | Miller et al. | ............ | B01D 35/04 137/430 |
| 1,963,867 A | 6/1934 | Robisch | | |
| 2,438,245 A | 3/1948 | Gregg | | |
| 2,603,230 A | 7/1952 | Krieger, Jr. | | |
| 2,886,056 A * | 5/1959 | Ratliff | ............ | F16K 31/24 137/428 |
| 3,007,484 A | 11/1961 | Hallinan | | |
| 3,043,107 A * | 7/1962 | Magaus, Jr. | ............ | F04F 5/48 417/184 |
| 3,428,063 A | 2/1969 | Plotkin et al. | | |
| 3,810,714 A * | 5/1974 | Turner | ............ | F02C 7/232 417/182.5 |
| 3,841,089 A * | 10/1974 | Clark | ............ | F02C 7/232 137/202 |
| 3,929,155 A | 12/1975 | Garretson | | |
| 4,066,386 A * | 1/1978 | Johnson | ............ | F02C 7/232 417/199.2 |
| 4,719,749 A | 1/1988 | Greune et al. | | |
| 4,831,990 A | 5/1989 | Tuckey | | |
| 5,447,175 A | 9/1995 | Takaki et al. | | |
| 5,711,339 A | 1/1998 | Kurihara | | |
| 5,894,857 A | 4/1999 | Takaki et al. | | |
| 6,442,925 B1 * | 9/2002 | Dalton | ............ | F02C 7/232 60/39.094 |
| 6,484,510 B2 | 11/2002 | Futa, Jr. et al. | | |
| 7,383,856 B2 | 6/2008 | Martis et al. | | |
| 7,726,112 B2 | 6/2010 | Dooley | | |
| 7,762,478 B1 | 7/2010 | Czimmek et al. | | |
| 7,882,823 B2 | 2/2011 | Benjey | | |
| 8,100,153 B2 | 1/2012 | Hirata | | |
| 8,122,699 B2 | 2/2012 | Lawrence et al. | | |
| 8,141,576 B2 | 3/2012 | Matsuo | | |
| 8,291,929 B2 | 10/2012 | Greene et al. | | |
| 8,353,306 B2 | 1/2013 | Futa et al. | | |
| 8,602,362 B2 * | 12/2013 | Buchwald | ............ | B64D 37/24 220/88.3 |
| 9,239,032 B2 | 1/2016 | Hagen | | |
| 2004/0154302 A1 * | 8/2004 | Wernberg | ............ | F02C 7/232 60/739 |
| 2008/0061171 A1 | 3/2008 | Bayer | | |
| 2008/0271456 A1 | 11/2008 | Scully et al. | | |
| 2010/0116361 A1 | 5/2010 | Furuhashi et al. | | |
| 2010/0186828 A1 | 7/2010 | Matsuzaki et al. | | |
| 2010/0187451 A1 | 7/2010 | Vinski et al. | | |
| 2011/0005614 A1 | 1/2011 | Pifer et al. | | |
| 2012/0271527 A1 | 10/2012 | Zebrowski et al. | | |
| 2013/0036738 A1 | 2/2013 | Pora | | |
| 2014/0338752 A1 | 11/2014 | Moreno et al. | | |

* cited by examiner

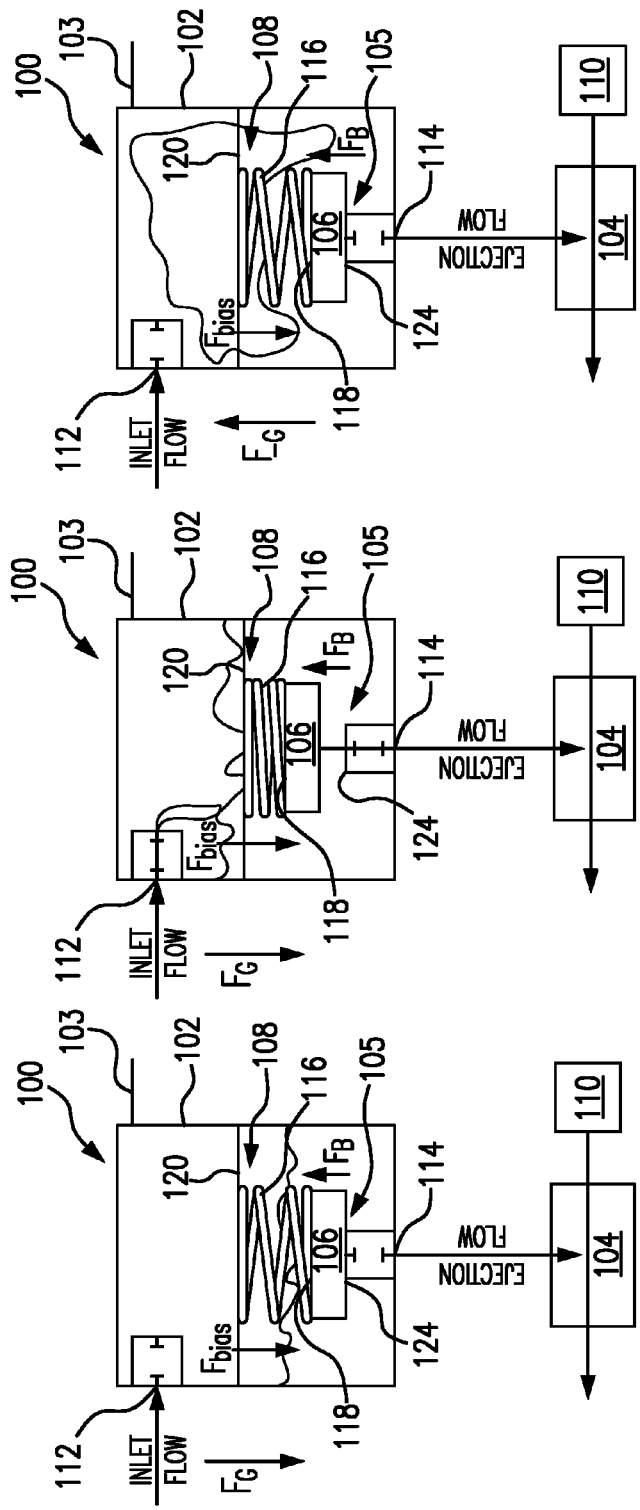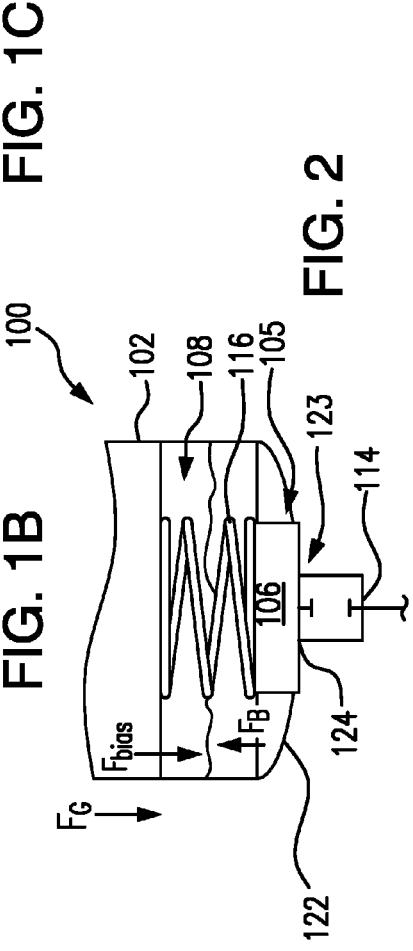

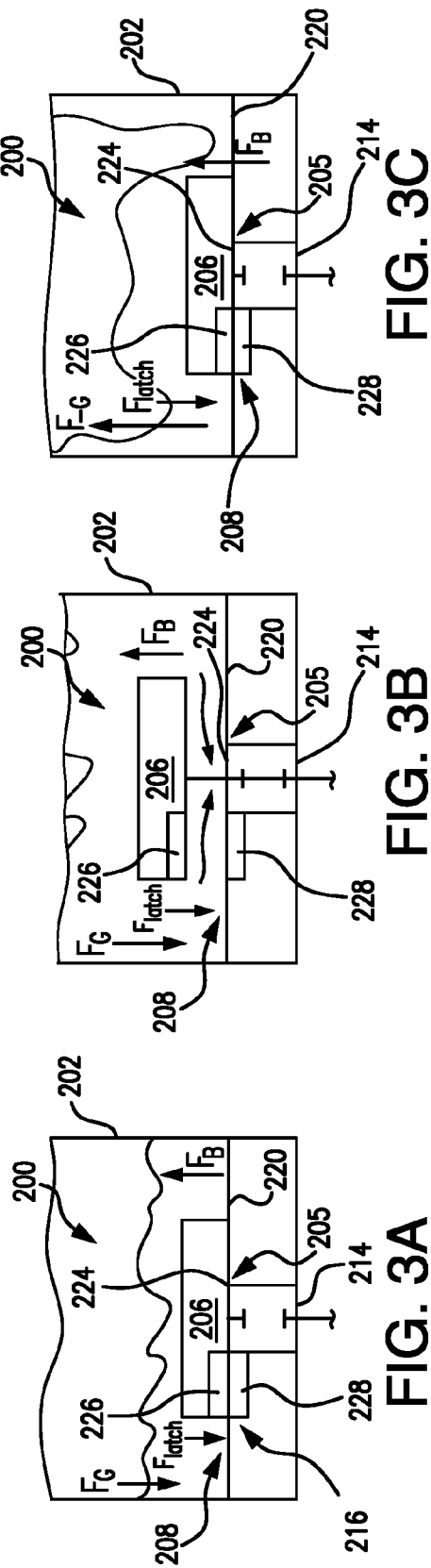
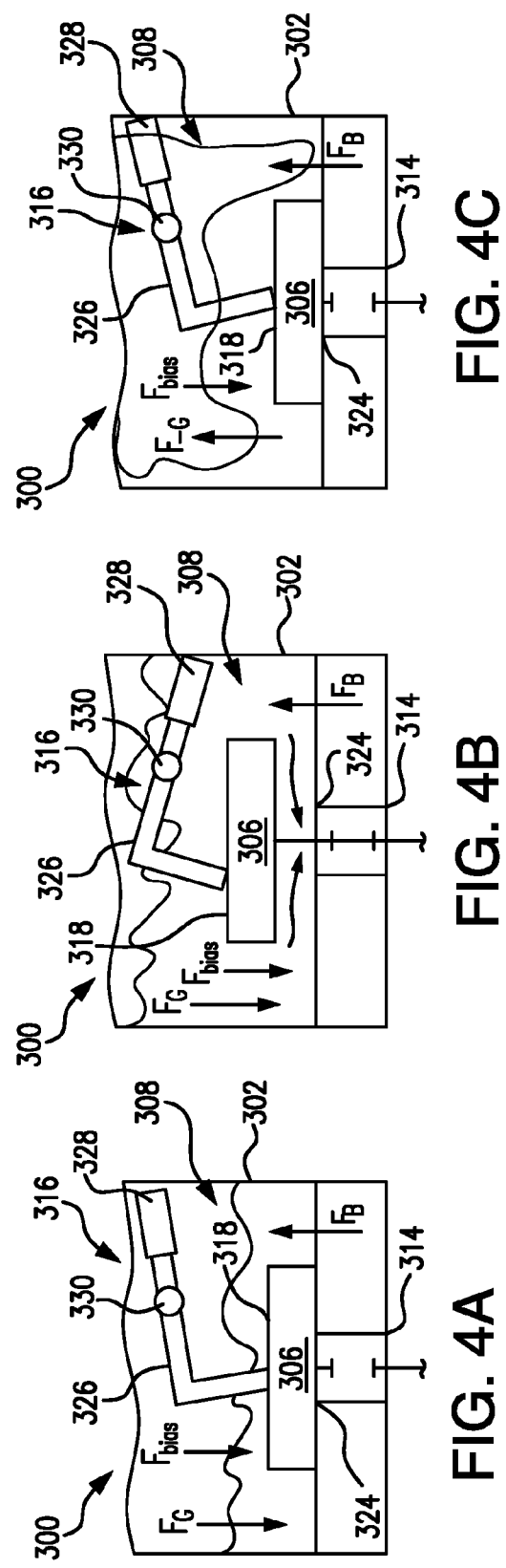

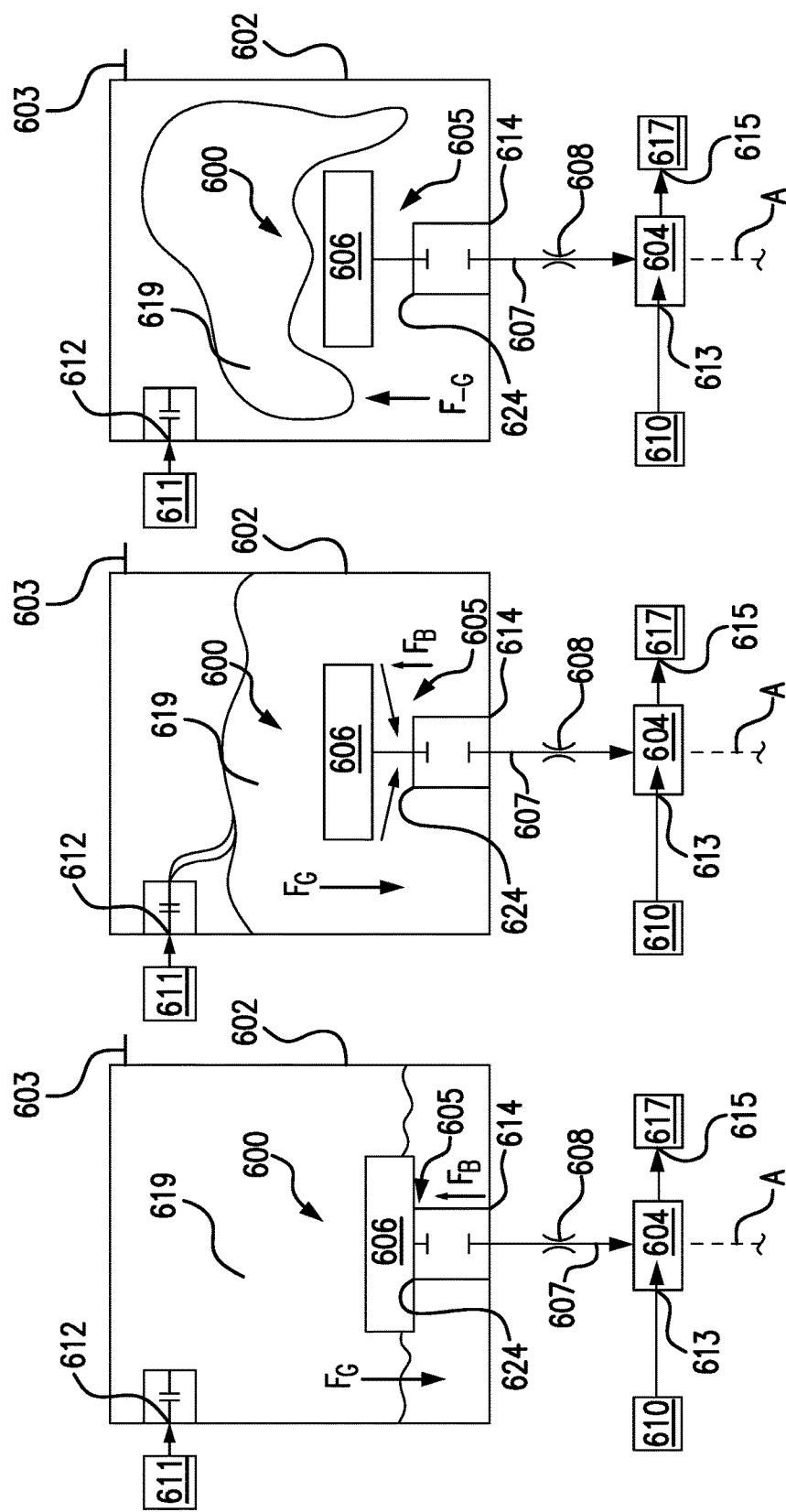

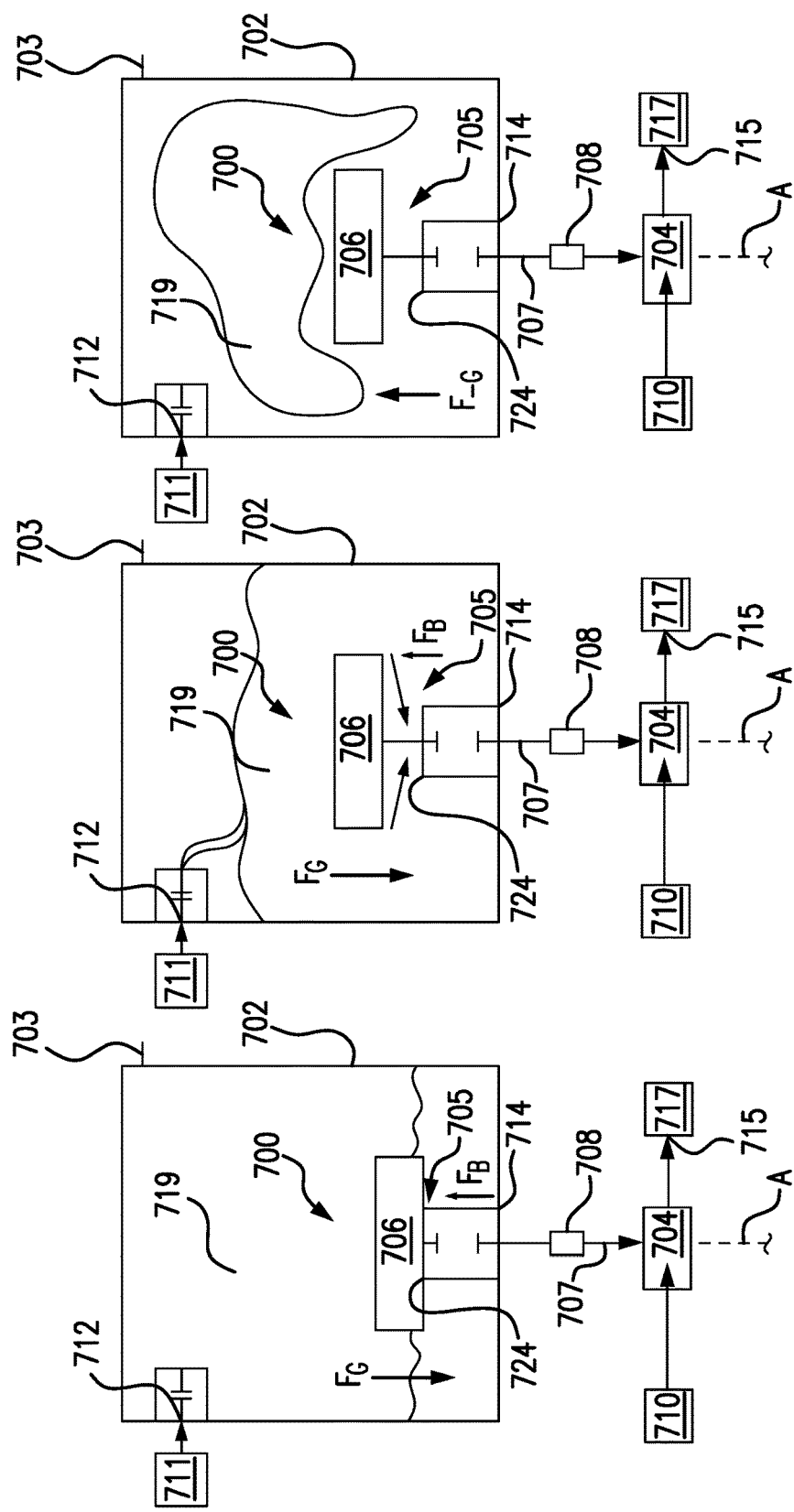

ECOLOGY FUEL RETURN SYSTEMS

CROSS-REFERENCE TO RELATED APPLICATIONS

This application is a continuation-in-part of U.S. patent application Ser. No. 14/340,275 filed Jul. 24, 2014, which is incorporated by reference herein in its entirety.

BACKGROUND OF THE INVENTION

1. Field of the Invention

The present invention relates to fuel return systems, and, in particular, to valves in fuel return systems.

2. Description of Related Art

Traditional ecology fuel return systems can be found in gas turbine engines, for example, in gas turbine engines used in aircraft. A traditional ecology fuel return system is generally configured to remove a certain amount of jet fuel from the engine's fuel manifolds, for example, fuel nozzle/injector manifolds, engine fuel supply lines, and the like, upon engine shutdown. Upon engine startup, the jet fuel from the ecology fuel return system is returned to the engine's fuel pump inlet via an ejector pump to be injected in the combustor thus providing stable engine idle operations. Ecology fuel return systems can minimize the amount of fuel left over in the engine's fuel system after engine shutdown, thus minimizing the possibility for any liquid fuel and/or any gaseous fuel vapor leaks into the environment. In addition, ecology fuel return systems can also prevent any potential coking of the fuel manifold nozzles and injectors by scavenging the "left-over" liquid fuel from the system upon engine shut-down when there is a significant engine heat soak. Finally, ecology fuel return systems can drain the combustor of any unused fuel upon engine shut-down thus preventing any smoke exhaust from the engine upon subsequent engine start-up and potentially causing some localized undesirable fuel-rich conditions in the combustor (i.e., "hot spots").

Traditional ecology fuel return systems can sometimes experience instability. For example, there is a potential for air leakage into the aircraft's fuel system under some circumstances, such as negative G events that can occur during some aircraft flight maneuvers. The air entrained in the fuel could interfere with normal operation of the engines.

Such conventional methods and systems have generally been considered satisfactory for their intended purposes. However, there is still a need in the art for systems and methods that allow for improved ecology fuel return systems. The present invention provides a solution for these problems.

SUMMARY OF THE INVENTION

A shut-off valve system includes a tank having an inlet and an outlet with a flow path defined therebetween. A float within the tank occludes the tank outlet at a first fluid level under positive G forces and unoccludes the tank outlet at a second fluid level under positive G forces. A flow restricting orifice and/or a hydraulic fuse is downstream of the float and the tank outlet to restrict fluid communication between the tank outlet and an ejector pump.

A flow direction of the flow path under positive G forces can be in the positive G direction. In accordance with some embodiments, the flow restricting orifice is in an ejector flow path defined between the tank outlet and an inlet of the ejector pump. A flow direction through the ejector flow path under positive G forces can be in the positive G direction. In accordance with some embodiments, the hydraulic fuse can be in an ejector flow path defined between the tank outlet and an inlet of the ejector pump. A flow direction through the ejector flow path under positive G forces can be in the positive G direction.

In accordance with another aspect, an ecology fuel return system includes a tank having an inlet and an outlet defining a flow path therebetween. The inlet can be in fluid communication with components of an engine for recovery of fuel. An ejector pump can be in fluid communication with the outlet of the tank to pump fuel from the tank to a fuel pump inlet of an engine. A float within the tank can occlude the tank outlet at a first fluid level under positive G forces and unocclude the tank outlet at a second fluid level under positive G forces. A flow restricting orifice and/or a hydraulic fuse can be downstream of the float and the tank outlet to restrict fluid communication between the tank outlet and the ejector pump.

In another aspect, a method for restricting flow in an ecology fuel return system includes recovering fuel from engine components and communicating the recovered fuel to an inlet of a fuel tank. The method includes pumping the recovered fuel from an outlet of the fuel tank to an inlet of an engine with an ejector pump when a float within the tank unoccludes the outlet of the fuel tank. The method includes restricting fluid flow from the tank outlet to the ejector pump with at least one of a flow restricting orifice or a hydraulic fuse downstream from the float and the tank outlet. The method can include activating the hydraulic fuse to restrict fluid flow during a negative G event. The method can include de-activating the hydraulic fuse to allow unrestricted fluid flow under positive G forces.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1A is a schematic cross-sectional view of an exemplary embodiment of an ecology fuel return system constructed in accordance with the present disclosure, showing the biasing component as a spring and the float in an occluded position under positive G forces;

FIG. 1B is a schematic cross-sectional view of the ecology fuel return system of FIG. 1A, showing the float in an unoccluded position under positive G forces;

FIG. 1C is a schematic cross-sectional view of the ecology fuel return system of FIG. 1A, showing the float in an occluded position under negative G forces;

FIG. 2 is a schematic cross-sectional view of a portion of another exemplary embodiment of an ecology fuel return system constructed in accordance with the present disclosure, showing the tank with a sloped bottom;

FIG. 3A is a schematic cross-sectional view of a portion of another exemplary embodiment of an ecology fuel return system constructed in accordance with the present disclosure, showing the biasing component as a magnet and a target, and the float in an occluded position under positive G forces;

FIG. 3B is a schematic cross-sectional view of the ecology fuel return system of FIG. 3A, showing the float in an unoccluded position under positive G forces;

FIG. 3C is a schematic cross-sectional view of the ecology fuel return system of FIG. 3A, showing the float in an occluded position under negative G forces;

FIG. 4A is a schematic cross-sectional view of a portion of another exemplary embodiment of an ecology fuel return system constructed in accordance with the present disclosure, showing the biasing component as a counterweighted lever and the float in an occluded position under positive G forces;

FIG. 4B is a schematic cross-sectional view of the ecology fuel return system of FIG. 4A, showing the float in an unoccluded position under positive G forces;

FIG. 4C is a schematic cross-sectional view of the ecology fuel return system of FIG. 4A, showing the float in an occluded position under negative G forces;

FIG. 8A is a schematic cross-sectional view of a portion of another exemplary embodiment of an ecology fuel return system constructed in accordance with the present disclosure, showing the float in an occluded position under positive G forces and a orifice downstream from the float;

FIG. 8B is a schematic cross-sectional view of the ecology fuel return system of FIG. 8A, showing the float in an unoccluded position under positive G forces;

FIG. 8C is a schematic cross-sectional view of the ecology fuel return system of FIG. 8A, showing the float in an unoccluded position under negative G forces;

FIG. 9A is a schematic cross-sectional view of a portion of another exemplary embodiment of an ecology fuel return system constructed in accordance with the present disclosure, showing the float in an occluded position under positive G forces and a hydraulic fuse downstream from the float;

FIG. 9B is a schematic cross-sectional view of the ecology fuel return system of FIG. 9A, showing the float in an unoccluded position under positive G forces;

FIG. 9C is a schematic cross-sectional view of the ecology fuel return system of FIG. 9A, showing the float in an unoccluded position under negative G forces.

DETAILED DESCRIPTION OF THE EMBODIMENTS

Figure 5:
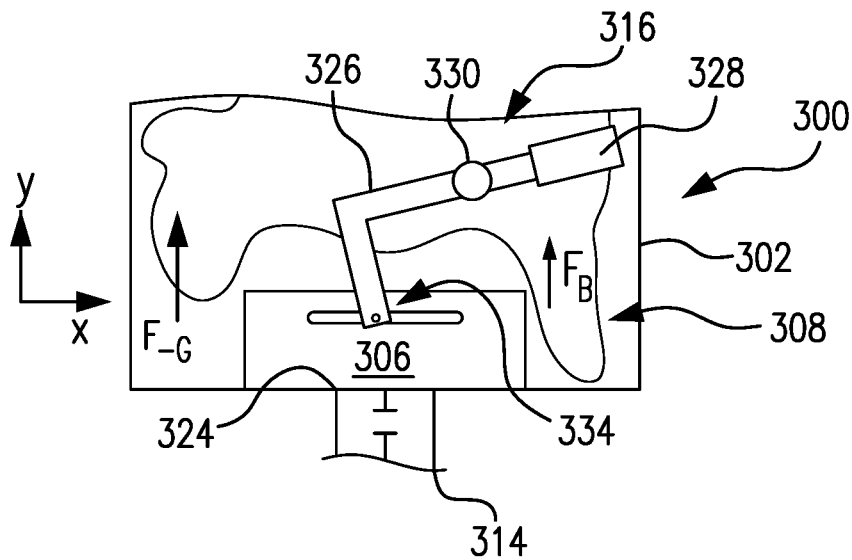
FIG. 5 is a schematic cross-sectional view of a portion of another exemplary embodiment of an ecology fuel return system constructed in accordance with the present disclosure, showing the biasing component as a counterweighted lever with a slotted pivot connecting the lever to the float.

Reference will now be made to the drawings wherein like reference numerals identify similar structural features or aspects of the subject disclosure. For purposes of explanation and illustration, and not limitation, a perspective view of an exemplary embodiment of an ecology fuel return system in accordance with the disclosure is shown in FIGS. 1A and 1s designated generally by reference character 100. Other embodiments of ecology fuel return systems in accordance with the disclosure, or aspects thereof, are provided in FIGS. 1B-10, as will be described. The systems and methods of the invention can be used to reduce the entrainment of continuous airflow into the fuel system, for example during negative G loading events, such as during aircraft maneuvers and turbulence, where the tank is driven to accelerate against gravity.

As shown in FIG. 1A, an ecology fuel return system 100 includes a tank 102, an ejector pump 104, a boost pump 110, and a shut-off valve 105 with a float 106 and a negative G control component 108. Tank 102 has an inlet 112, an outlet 114 and a vent 103. Vent 103 prevents pressurization of and a vacuum in tank 102. A vacuum in tank 102 can prevent fluid flow, e.g. liquid and/or gas flow, when valve 105 opens. Inlet 112 is configured to be in fluid communication with components of an engine (not shown) for recovery of fuel. Ejector pump 104 is in fluid communication with outlet 114 of tank 102 and is configured to pump fuel from tank 102 to a fuel pump inlet of the engine (not shown). Boost pump 110 is in fluid communication with ejector pump 104. Boost pump 110 is configured to induce fuel flow through ejector pump 104 from the fuel pump inlet of the engine.

With reference to FIGS. 1A-C, float 106 is configured to occlude tank outlet 114 at a first fluid level and 1 G, shown in FIG. 1A, and unocclude tank outlet 114 at a second fluid level and 1 G, shown in FIG. 1B. FIGS. 1A and 1B are examples of float 106 positions during positive G scenarios. Negative G control component 108 is operatively connected to float 106 to limit fluid communication between tank inlet 112 and/or vent 103, and ejector pump 104 during negative G events, for example the negative G event shown in FIG. 1C.

With continued reference to FIGS. 1A-1C, negative G control component 108 includes a biasing component 116 shown as a spring. Biasing component 116, e.g. spring, also includes a spring retaining feature 120 operatively connected to spring 116 opposing float 106. Spring 116 is configured to apply a biasing force $F_{bias}$ to float 106. Spring 116 is operatively connected to a top portion 118 of float 106 and to spring retaining feature 120. The direction of biasing force $F_{bias}$ is indicated schematically by a downward pointing arrow in FIGS. 1A-1C.

As shown in FIG. 1A, biasing force $F_{bias}$ of spring 116 is greater or equal to a buoyancy force $F_B$ of float 106 at a first fluid level and 1 G. The direction of buoyancy force $F_B$ of float 106 is indicated schematically by an upward pointing arrow on the right-hand side, as oriented in FIGS. 1A-1C. The direction of the G force, $F_G$, is indicated schematically by a downward pointing arrow on the left-hand side as oriented in FIG. 1A. Those skilled in the art will readily appreciate that proper sizing of this design results in sizing float 106 so that as the fluid level in tank 102 increases, its buoyancy force $F_B$ can overcome biasing force $F_{bias}$ of spring 116.

With reference now to FIG. 1B, as the fluid level in tank 102 increases, biasing force $F_{bias}$ of spring 116 becomes less than buoyancy force $F_B$ of float 106 at 1 G. The direction of G force $F_G$ is indicated schematically by a downward pointing arrow on the left-hand side, as oriented in FIG. 1B. As float 106 rises, it further compresses spring 116 and moves to an unoccluded position. This increases the force limiting the movement of float 106, and, therefore also limits the resulting float 106 displacement. In the unoccluded position, float 106 does not block fluid communication through shut-off valve 105 to ejector pump 104. Fluid travels from tank inlet 112, through shut-off valve 105, as indicated by the two inward pointing arrows, to tank outlet 114, and to ejector pump 104.

Referring now to FIG. 1C, ecology fuel return system 100 is shown in a negative G event. The negative G event causes a negative G force $F_{-G}$. The direction of negative G force $F_{-G}$ is indicated schematically by an upward pointing arrow on the left-hand side, as oriented in FIG. 1C. This negative G force, in traditional ecology fuel return systems, with the aircraft in its normal flight attitude, tends to cause fluid in a tank and a float to move upwards, allowing air to flow from the tank to be drawn into a pump and into a corresponding engine. In ecology fuel return system 100, biasing force $F_{bias}$ of spring 116 is greater than negative G event force $F_{-G}$ so that when buoyancy force $F_B$ of float 106 decreases due to the fluid moving out from under float 106, biasing force $F_{bias}$ of spring 116 overcomes negative G event force $F_{-G}$ and forces float 106 to an occluded position covering tank outlet 114 and reducing the air ingestion via ejector pump 104. Ecology fuel return system 100 allows the fluid level to be above shut-off valve opening 124, such that float 106 will be partially submerged leaving more residual fluid in tank 102 at shut-off. Those skilled in the art will readily appreciate that a small amount of fuel remaining in tank 102 after engine shut-off tends to ensure minimal air entrapment in the fuel supply lines upon engine re-start, helping to avoid any discontinuous fuel supply to the engine's fuel injectors. It is contemplated that in some applications residual fluid in tank 102 can be reduced by sloping the bottom of tank 102 towards shut-off valve opening 124 and outlet 114, as described below with respect to FIG. 2.

As shown in FIG. 2, ecology fuel return system 100 is shown with a shut-off valve opening 124 closer to a bottom 123 of tank 102. Bottom 123 of tank 102 also includes a slope 122 towards shut-off valve opening 124 and outlet 114. Sloped tank bottom 123 limits the accumulated fluid volume in tank 102 at shut-off. The angle and overall shape of slope 122 are such that the remaining fuel volume is minimized. Those skilled in the art will readily appreciate that by reducing the amount of fuel volume left over in the ecology fuel tank after engine shut-off a smaller ecology fuel tank can be used, therein reducing the overall weight of the system, fuel spill potential and release of fuel vapors can be reduced, therein mitigating potential environmental impact, and the propensity for visible exhaust smoke during cold engine re-start can be reduced. It is contemplated that there are a variety of suitable geometric configurations for tank bottom 123 that can be used.

Now with reference to FIGS. 3A-3C, another exemplary embodiment of an ecology fuel return system 200 is shown. Ecology fuel return system 200 is similar to ecology fuel return system 100, except that a negative G control component 208 of system 200 includes a biasing component 216 that is a magnet 226 and a corresponding target 228 instead of a spring. Magnet 226 is connected to float 206 and target 228 is connected to a magnet retaining feature 220. Those skilled in the art will readily appreciate that magnet 226 can alternatively be connected to magnet retaining feature 220 and target 228 can be connected to float 206. It is also contemplated that magnet 226 and its respective target 228 can be oriented in a variety of suitable positions and have a variety of suitable geometric shapes, as needed for a given application.

As shown in FIG. 3A, a biasing force $F_{bias}$ of biasing component 216, e.g. a latching force $F_{latch}$ of magnet 226 and target 228, is greater or equal to a buoyancy force $F_B$ of float 206 at a first fluid level and a G force $F_G$, for example, 1 G or greater, similar to ecology fuel return system 100 shown in FIG. 1A. The direction of G force $F_G$ is indicated schematically by a downward pointing arrow on the left-hand side, as oriented in FIGS. 3A and 3B. The direction of latching force $F_{latch}$ is indicated schematically by a downward pointing arrow in FIGS. 3A-3C. The direction of buoyancy force $F_B$ is indicated schematically by an upward pointing arrow on the right-hand side, as oriented in FIGS. 3A-3C. Those skilled in the art will readily appreciate that magnet 226, e.g. permanent magnet, and target 228, e.g. magnetically permeable target, are brought close enough in proximity in order to induce a magnetic attraction force, e.g. $F_{latch}$, large enough to close float 206 and/or to keep float 206 closed.

With reference now to FIG. 3B, as the fluid level in tank 202 increases, latching force $F_{latch}$ of magnet 226 and target 228 becomes less than buoyancy force $F_B$ of float 206 at a second fluid level and $F_G$, similar to ecology fuel return system 100 shown in FIG. 1B. As the fluid level in tank 202 rises, buoyancy force $F_B$ of float 206 overcomes latching force $F_{latch}$ of magnet 226 and target 228 and float 206 moves into an unoccluded position, similar to unoccluded position described above with respect to FIG. 1B. Because $F_{latch}$ only acts in close proximity between magnet 226 and target 228, once latching force $F_{latch}$ is overcome there is no additional load on float 206 as there is with float 106 of ecology fuel return system 100.

Referring now to FIG. 3C, a negative G event, similar to the negative G event described above with respect to ecology fuel return system 100, is shown. In ecology fuel return system 200, latching force $F_{latch}$ of magnet 226 and target 228 is greater than negative G event force $F_{-G}$, the direction of which is indicated schematically by an upward pointing arrow, in order to overcome negative G event force $F_{-G}$, similar to biasing force $F_{bias}$ of spring 116 as described above with respect to FIG. 1C. Ecology fuel return system 200 with the magnet design also allows the fluid level to be above opening 224 of shut-off valve 205, as described above with respect to ecology fuel return system 100. Those skilled in the art will readily appreciate that residual fluid in tank 202 can be reduced by having the latching distance between magnet 226 and target 228 kept to a minimum. It is also contemplated that the residual fluid can be reduced by sloping the bottom of tank 202 toward opening 224 and outlet 214, and/or having opening 224 of shut-off valve 205 closer to the bottom of tank 202, similar to tank 102 shown in FIG. 2.

As shown in FIGS. 4A-4C, another embodiment of an ecology fuel return system 300 is shown. Ecology fuel return system 300 is similar to ecology fuel return system 100, except that a negative G control component 308 of system 300 includes a biasing component 316 that is a counterweighted lever. Biasing component 316, e.g. counterweighted lever, includes a lever arm 326 and an opposing ballast 328 with a pivot point 330 therebetween. A coil spring at pivot point 330 operatively connects to lever arm 326 for loading lever arm 326 against a top portion 318 of float 306.

Referring now to FIG. 4A, a biasing force $F_{bias}$ of counterweighted lever 316, the direction of which is indicated schematically by a downward pointing arrow in FIGS. 4A-4C, is greater or equal to a buoyancy force $F_B$ of float 306, the direction of which is indicated schematically by an upward pointing arrow in FIGS. 4A-4C, at a first fluid level and a G force $F_G$, for example, 1 G or greater, similar to ecology fuel return system 100 shown in FIG. 1A. The direction of G force $F_G$ is indicated schematically by a downward pointing arrow on the left-hand side, as oriented in FIGS. 4A and 4B. At this position, counterweighted lever 316 is nearly in force-balance about pivot point 330 with a slight bias provided by the coil spring to keep lever arm 326 in contact with float 306.

With reference now to FIG. 4B, as the fluid level in tank 302 increases, the biasing force $F_{bias}$ of counterweighted lever 316 becomes less than buoyancy force $F_B$ of float 306 at $F_G$, and float 306 moves into an unoccluded position, similar to ecology fuel return system 100 shown in FIG. 1B, described above. Similar to ecology fuel return system 100, the spring load on the coil spring also increases as the fluid level in tank 302 increases, but by a smaller magnitude since it is contributing only the force required to offset the counter weight at a zero G force. This reduced spring load reduces the buoyancy force $F_B$ required to move float 306 to an occluded position, reducing the size of float 306 required.

Referring now to FIG. 4C, a negative G event is shown. The negative G event is similar to the negative G event shown and described with respect to FIG. 1C. The direction of negative G force $F_{-G}$ is indicated schematically by an upward pointing arrow. In ecology fuel return system 300, a torque about pivot point 330 fixed to tank 302 is generated to keep float 306 in the closed position during the negative G event. Ecology fuel return system 300 also allows the fluid level to be above shut-off valve opening 324, similar to ecology fuel return system 100 described above. It is contemplated that residual fluid left in tank 302 can be reduced by sloping the bottom of tank 302 toward shut-off valve opening 324 and outlet 314, and/or having shut-off valve opening 324 closer to the bottom of tank 302, similar to tank 102 shown in FIG. 2.

As shown in FIG. 5, counterweighted lever 316 includes a slotted pivot 334 instead of the coil spring to operatively connect lever arm 326 and float 306. Those skilled in the art will readily appreciate that slotted pivot 334 may tend to cause counterweighted lever 316 to be susceptible to positive G events that drive float 306 to close when it may need to be open to drain tank 302. For example, additional lateral displacement of tank 302 may cause internal fluid displacement that could cause float 306 to rise, potentially ingesting air even when under positive G forces. Those skilled in the art will readily appreciate that internal baffles (not shown) may be used to limit such displacement. System 300 with slotted pivot 334 also decreases the number of degrees of freedom (DOF) by one (in the z-direction, i.e., in/out of the page as oriented in FIG. 5). Movements in the horizontal (x-direction) and vertical (y-direction), indicated schematically by the axis arrows on the left-hand side as oriented in FIG. 5, are allowed. System 300 with coil spring, shown in FIGS. 4A-4C, allows 3 DOF in the x-, y-, and z-directions.

Figure 6A:
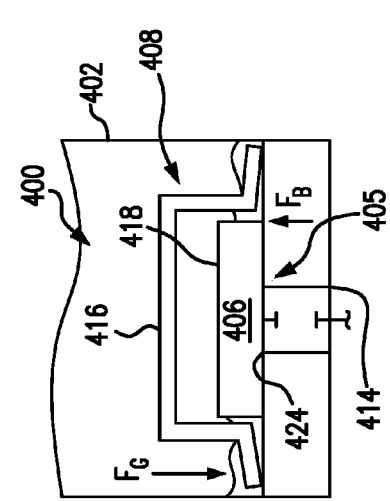
FIG. 6A is a schematic cross-sectional view of a portion of another exemplary embodiment of an ecology fuel return system constructed in accordance with the present disclosure, showing the slosh plate and the float, where the float is in an occluded position under positive G forces.
Figure 6B:
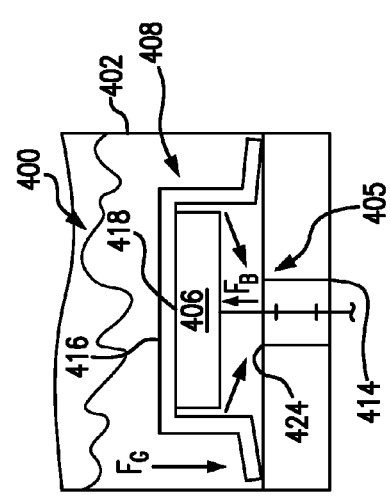
FIG. 6B is a schematic cross-sectional view of the ecology fuel return system of FIG. 6A, showing the float in an unoccluded position under positive G forces.
Figure 6C:
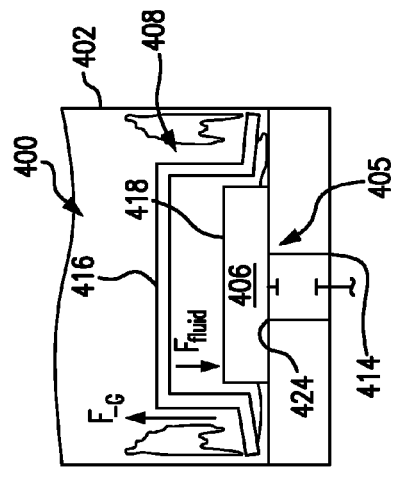
FIG. 6C is a schematic cross-sectional view of the ecology fuel return system of FIG. 6A, showing the float in an occluded position under negative G forces.

As shown in FIGS. 6A-C, another embodiment of an ecology fuel return system 400 is shown. Ecology fuel return system 400 is similar to ecology fuel return system 100, except that negative G control component 408 does not include a biasing component, e.g. spring 116, as shown and described above with respect to FIGS. 1A-1C. Instead, negative G control component 408 includes a slosh plate 416 disposed proximate to float 406 surrounding at least a portion of float 406. Slosh plate 416 is connected to tank 402 between an inlet, not shown, but similar to inlet 112, and float 406. Those skilled in the art will readily appreciate that ecology fuel return system 400 has no moving parts except for float 406, therefore advantageously reducing the possible failure modes.

Referring now to FIG. 6A, float 406 is in a similar position as described above with respect to FIG. 1A. Float 406, however, does not include a biasing component. Therefore, a buoyancy force $F_B$ of float 406 does not have to overcome any additional force in order to provide fluid flow to the ejector pump, not shown, at a G force $F_G$, for example, 1 G or greater. The direction of G force $F_G$ is indicated schematically by a downward pointing arrow on the left-hand side, as oriented in FIGS. 6A and 6B. Ecology fuel return system 400 also allows the fluid level to be above an opening 424 of shut-off valve 405, similar to ecology fuel return system 100 described above. It is contemplated that residual fluid left in tank 402 can be reduced by sloping the bottom of tank 402 towards shut-off valve opening 424 and outlet 414, and/or having shut-off valve opening 424 closer to the bottom of tank 402, similar to tank 102 shown in FIG. 2.

As shown in FIG. 6B, as the fluid level in tank 402 increases, buoyancy force $F_B$ of float 406 at $F_G$ increases and float 406 moves into an unoccluded position above opening 424 of shut-off valve 405, similar to ecology fuel return system 100 shown in FIG. 1B, described above. The direction of buoyancy force $F_B$ is indicated schematically by an upward pointing in FIGS. 6A-6B. It is contemplated that a top of float 418 may contact slosh plate 416, but that top of float 418 can be shaped in a way as to permit the fluid to flow between it and slosh plate 416. For example, it is contemplated that, the top of float 418 may have any continuous smooth geometrical shape that allows free contact between the top of float 418 and slosh plate 416, such as spherical, concave, convex, linear, or the like.

Now with reference to FIG. 6C, a negative G event is shown. The negative G event is similar to the negative G event shown and described with respect to FIG. 1C. Slosh plate 416 is configured to concentrate fluid between slosh plate 416 and float 406 during the negative G event to damp the displacement of float 406 against a negative G event force $F_{-G}$. The direction of negative G force $F_{-G}$ is indicated schematically by an upward pointing arrow on the left-hand side, as oriented in FIG. 6C. The surface area of slosh plate 416 where top of float 418 and slosh plate 416 meet is smaller than the collection area of slosh plate 416 near the bottom of tank 402. During a negative G event, this difference assists in concentrating the fluid volume as it displaces into slosh plate 416. The volume of fluid concentrated under slosh plate 416 and the resulting momentum of that fluid provides a force $F_{fluid}$ to limit float 406 displacement and drive float 406 back to the occluded position directly above opening 424 of shut-off valve 405. The amount of fluid volume displaced and the velocity of the displaced fluid limits the duration of force $F_{fluid}$. The direction of force $F_{fluid}$ is indicated schematically by a downward pointing arrow. Those skilled in the art will readily appreciate that float 406 and fluid may initially displace together during the negative G event, potentially allowing a temporary ingestion of air into fuel system 400.

Figure 7A:
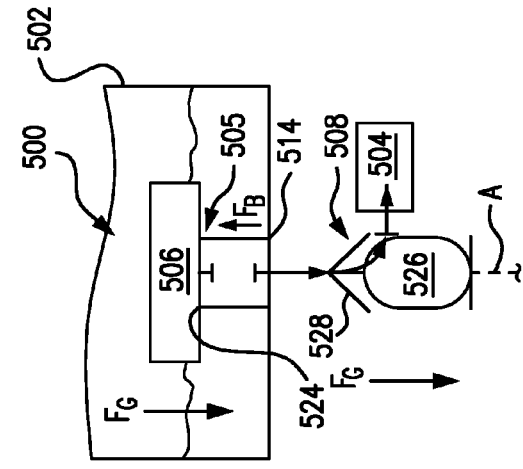
FIG. 7A is a schematic cross-sectional view of a portion of another exemplary embodiment of an ecology fuel return system constructed in accordance with the present disclosure, showing the check valve and the poppet in an unoccluded position and the float in an occluded position under positive G forces.
Figure 7B:
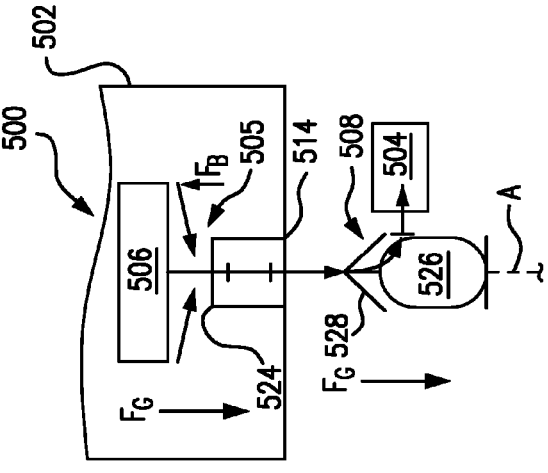
FIG. 7B is a schematic cross-sectional view of the ecology fuel return system of FIG. 7A, showing the check valve and the poppet in an unoccluded position and the float in an unoccluded position under positive G forces.
Figure 7C:
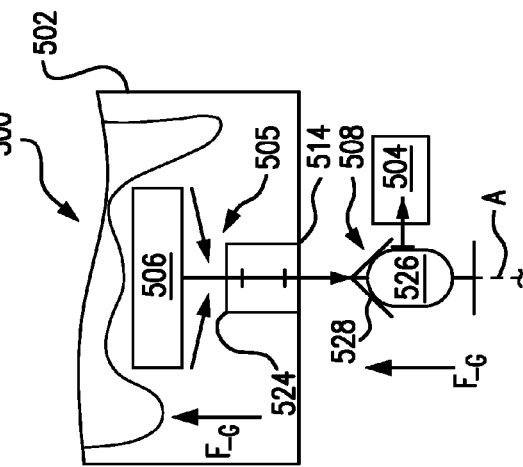
FIG. 7C is a schematic cross-sectional view of the ecology fuel return system of FIG. 7A, showing the check valve and the poppet in an occluded position and the float in an unoccluded position under negative G forces.

As shown in FIGS. 7A-7C, another embodiment of an ecology fuel return system 500 is shown. Ecology fuel return system 500 is similar to ecology fuel return system 100, except that a negative G control component 508 does not include a biasing component, e.g. spring 116, as shown and described above with respect to FIGS. 1A-1C. Instead, negative G control component 508 is a check valve in fluid communication with a float 506. Negative G control component 508, e.g. check valve, includes a poppet 526 configured to freely translate along a valve axis A. Poppet 526 is configured to translate between a first unoccluded position, shown in FIGS. 7A and 7B, and a second occluded position, shown in FIG. 7C. Check valve 508 is configured to block fluid flow from a tank outlet 514 to an ejector pump 504 during negative G events. Ejector pump 504 is similar to ejector pump 104, described above. It is contemplated that a boost pump, similar to boost pump 110, while not shown, can be in fluid communication with ejector pump 504.

Now with reference to FIG. 7A, in a first position, at a first fluid level and at 1 G or greater, poppet 526 is in an unoccluded position. Float 506 is in a similar occluded position, above and opening 524 of shut-off valve 505, as described above with respect to FIG. 1A. Float 506, however, does not include a biasing component, e.g. spring 116. Therefore, a buoyancy force $F_B$ of float 506 does not have to overcome any additional force in order to provide fluid flow to ejector pump 504 at a G force $F_G$, for example, 1 G or greater. The direction of G force $F_G$ is indicated schematically by downward pointing arrows on the left-hand side, as oriented in FIGS. 7A and 7B. The direction of buoyancy force $F_B$ is indicated schematically by an upward pointing arrow on the right-hand side, as oriented in FIGS. 7A-7B.

As shown in FIG. 7B, as the fluid level in tank 502 increases, buoyancy force $F_B$ of float 506 at 1 G or greater increases and float 506 moves into an unoccluded position, similar to ecology fuel return system 100 shown in FIG. 1B, described above. Poppet 526 remains in an unoccluded position to allow fluid to flow to ejector pump 504.

Now with reference to FIG. 7C, a negative G event is shown. The negative G event is similar to the negative G event shown and described with respect to FIG. 1C. The direction of a negative G force $F_{-G}$ is indicated schematically by upward pointing arrows on the left-hand side, as oriented in FIG. 7C. Float 506, however does not have any biasing component, for example spring 116, or a damping component, e.g. slosh plate 416, thus float 506 is sensitive to the influence of external loads as shut-off valve 505 operates with low-to-no force margin to keep it closed. Therefore, float 506 is forced upwards, as oriented in FIG. 7C, and remains in an unoccluded position during a negative G event. During a negative G event, poppet 526 is also forced upwards, as oriented in FIG. 7C, and seats in valve inlet 528, sealing valve inlet 528 and preventing flow from tank outlet 514 to ejector pump 504.

Those skilled in the art will readily appreciate that poppet 526 can have a variety of suitable sizes and shapes, but generally should be large enough to allow for an adequate sealing surface, and small enough to minimize drag effects on poppet 526 that could prevent it from seating properly in valve inlet 528. It is contemplated that poppet 526 can be made of a dense material, such that poppet 526 has a sufficient momentum during a negative G event to properly seal valve inlet 528. Those skilled in the art will readily appreciate that by minimizing the actuation distance, e.g. the distance poppet 526 needs to travel along valve axis A from a full open position, shown in FIG. 7A, to full closed position, shown in FIG. 7C, the amount of air that can be ingested by ejector pump 504 during the closing of valve inlet 528 at the beginning of the negative G event tends to be reduced. It is also contemplated that a poppet guide, not shown, can be designed to prevent any movement of poppet 526 in unintended alternate directions, e.g. directions at an angle with respect to valve axis A. Those skilled in the art will also readily appreciate that because poppet 526 is essentially unrestricted along valve axis A, contact surfaces of poppet 526 can be designed to minimize or eliminate negative effects caused by poppet vibration.

As shown in FIGS. 8A-8C, another embodiment of an ecology fuel return system 600 is shown. Ecology fuel return system 600 is similar to ecology fuel return system 100, except that a negative G control component 608 does not include a biasing component, e.g. spring 116, counter-weighted lever 316 or magnet 226, as shown and described above. Instead, negative G control component 608 is a flow restricting orifice 608 in fluid communication with a float 606. Orifice 608 restricts flow, while biasing components act on a float to attempt to block flow entirely. Orifice 608 provides execution without any moving parts, so there tends to be an inherent reliability improvement over systems with moving parts. System 600 includes a tank 602 having an inlet 612 and an outlet 614 with a flow path 619 defined therebetween. Tank inlet 612 is in fluid communication with engine components 611 for recovery of fuel. Tank 602 includes a vent 603 that prevents pressurization of and a vacuum in tank 602. Those skilled in the art will readily appreciate that tank 602 is exposed to ambient pressures through vent 603 and is an open ecology fuel return system 600.

With continued reference to FIGS. 8A-8C, float 606 within tank 602 occludes tank outlet 614 at a first fluid level under positive G forces, for example, 1 G or greater, as shown in FIG. 8A, and unoccludes tank outlet 614 at a second fluid level under positive G forces, e.g. also 1 G, as shown in FIG. 8B. Flow restricting orifice 608 is downstream from float 606 and tank outlet 614 to restrict fluid communication between tank outlet 614 and an ejector pump 604. Ejector pump 604 is in fluid communication with tank outlet 614 to pump fuel from tank 602 to a fuel pump inlet 615 of an engine 617. While engine 617 is shown schematically in FIGS. 8A-8C in a different position with respect to engine components 611, those skilled in the art will readily appreciate that engine components 611 can contained within or around engine 617. Flow restricting orifice 608 restricts fluid communication from tank outlet 614 to an inlet 613 of ejector pump 604 under positive and negative G forces. Ejector pump 604 is similar to ejector pump 104, described above. It is contemplated that a boost pump 610, similar to boost pump 110, can be in fluid communication with ejector pump 604.

As shown in FIGS. 8A and 8B, a flow direction of flow path 619 under positive G forces is in the positive G direction, e.g. in the direction of $F_G$. Flow restricting orifice 608 is in an ejector flow path 607 defined between tank outlet 614 and inlet 613 of ejector pump 604. A flow direction through ejector flow path 607 along axis A under positive G forces is also in the positive G direction.

Now with reference to FIG. 8B, in a first position, at a first fluid level under positive G forces, float 606 is in a similar occluded position, above an opening 624 of shut-off valve 605, as described above with respect to FIG. 1A. Float 606, however, does not include a biasing component, e.g. spring 116. Therefore, a buoyancy force $F_B$ of float 606 does not have to overcome any additional force in order to provide fluid flow to ejector pump 604 at a positive G force $F_G$. The direction of positive G force $F_G$ is indicated schematically by downward pointing arrows on the left-hand side, as oriented in FIGS. 8A and 8B. The direction of buoyancy force $F_B$ is indicated schematically by an upward pointing arrow on the right-hand side, as oriented in FIGS. 8A-8B. As the fluid level in tank 602 increases, buoyancy force $F_B$ of float 606 under positive G forces increases and float 606 moves into an unoccluded position, similar to ecology fuel return system 100 shown in FIG. 1B, described above.

Now with reference to FIG. 8C, a negative G event is shown. The negative G event is similar to the negative G event shown and described with respect to FIG. 1C. The direction of a negative G force $F_{-G}$ is indicated schematically by upward pointing arrows on the left-hand side, as oriented in FIG. 8C. Float 606, however does not have any biasing component, for example spring 116, or a damping component, e.g. slosh plate 416, thus float 606 is sensitive to the influence of external loads as shut-off valve 605 operates with low-to-no force margin to keep it closed. Therefore, float 606 is forced upwards, as oriented in FIG. 8C, and remains in an unoccluded position during a negative G event. During a negative G event, just as under positive G forces, flow restricting orifice 608 restricts fluid flow, including air or other gases, from flowing from tank outlet 614 to ejector pump 604. By using orifice 608 to restrict flow to ejector pump 614, regardless of the failure mode of valve 605, flow of air into ejector pump 614 and ultimately into engine 617 is reduced. While orifice 608 may impact the ability of elements of pump 614 to generate pressure and flow, orifice 608 is properly sized in order to limit the normal drain rate of fluid from tank 602, but ensure that the engine does not flame out. Orifice 608 also results in a simple, reliable and robust solution to reducing air entrainment in jet fuel, which, in turn, results in reduced fuel coking and plugging of fuel injectors, and minimizes the possibility for fuel cavitation in main fuel pumps, unwanted engine in-flight shut-downs, fuel pump degradation, and engines operating at reduced power.

As shown in FIGS. 9A-9C, another embodiment of an ecology fuel return system 700 is shown. Ecology fuel return system 700 is similar to ecology fuel return system 100, except that a negative G control component 708 does not include a biasing component, e.g. spring 116, counterweighted lever 316 or magnet 226, as shown and described above. Instead, negative G control component 708 is a hydraulic fuse 708 in fluid communication with a float 706. System 700 includes a tank 702 having an inlet 712 and an outlet 714 with a flow path 719 defined therebetween. Tank inlet 712 is in fluid communication with engine components 711 for recovery of fuel. Tank 702 includes a vent 703 that prevents pressurization of and a vacuum in tank 702. Those skilled in the art will readily appreciate that tank 702 is exposed to ambient pressures through vent 703 and is an open ecology fuel return system 700.

With continued reference to FIGS. 9A-9C, float 706 within tank 702 occludes tank outlet 714 at a first fluid level under positive G forces, as shown in FIG. 9A, and unoccludes tank outlet 714 at a second fluid level under positive G forces, as shown in FIG. 9B. Hydraulic fuse 708 is downstream from float 706 and tank outlet 714 to restrict fluid communication between tank outlet 714 and an ejector pump 704. Ejector pump 704 is in fluid communication with tank outlet 714 to pump fuel from tank 702 to a fuel pump inlet 715 of an engine 717. While engine 717 is shown schematically in FIGS. 9A-9C in a different position with respect to engine components 711, those skilled in the art will readily appreciate that engine components 711 can contained within or around engine 717. Hydraulic fuse 708 is activated during negative G forces to restrict fluid communication from tank outlet 714 to ejector pump 704 under negative G forces. During positive G forces, e.g. as shown in FIGS. 9A and 9B, flow to ejector pump 704 is not restricted by hydraulic fuse 708. A flow direction through ejector flow path 707 along axis A under positive G forces is also in the positive G direction. Ejector pump 704 is similar to ejector pump 104, described above. It is contemplated that a boost pump 710, similar to boost pump 110, can be in fluid communication with ejector pump 704.

Now with reference to FIG. 9B, in a first position, at a first fluid level under positive G force $F_G$, for example, 1 G or greater, float 706 is in a similar occluded position, above and opening 724 of shut-off valve 705, as described above with respect to FIG. 1A. Float 706, however, does not include a biasing component, e.g. spring 116. Therefore, a buoyancy force $F_B$ of float 706 does not have to overcome any additional force in order to provide fluid flow to ejector pump 704 at positive G force $F_G$. The direction of G force $F_G$ is indicated schematically by downward pointing arrows on the left-hand side, as oriented in FIGS. 9A and 9B. The direction of buoyancy force $F_B$ is indicated schematically by an upward pointing arrow on the right-hand side, as oriented in FIGS. 9A-9B. As the fluid level in tank 702 increases, buoyancy force $F_B$ of float 706 under positive G forces increases and float 706 moves into an unoccluded position, similar to ecology fuel return system 100 shown in FIG. 1B, described above.

Now with reference to FIG. 9C, a negative G event is shown. The negative G event is similar to the negative G event shown and described with respect to FIG. 1C. The direction of a negative G force $F_{-G}$ is indicated schematically by upward pointing arrows on the left-hand side, as oriented in FIG. 9C. Float 706, however, does not have any biasing component, for example spring 116, or a damping component, e.g. slosh plate 416, thus float 706 is sensitive to the influence of external loads as shut-off valve 705 operates with low-to-no force margin to keep it closed. Therefore, float 706 is forced upwards, as oriented in FIG. 9C, and remains in an unoccluded position during a negative G event. This can permit air and other gases to exit tank outlet 714, as shown schematically by the two arrows pointing axially inwards in FIG. 9C. During a negative G event, hydraulic fuse 708 is activated and restricts fluid flow from tank outlet 714 to ejector pump 704. This prevents unwanted ingestion of air and other gases into ejector pump 704. Hydraulic fuse 708 can be a spring loaded valve that activates and closes if flow rapidly increases with an increased pressure drop. In that scenario, the spring load on the valve is overcome and it closes to either isolate or restrict flow.

Figure 10:
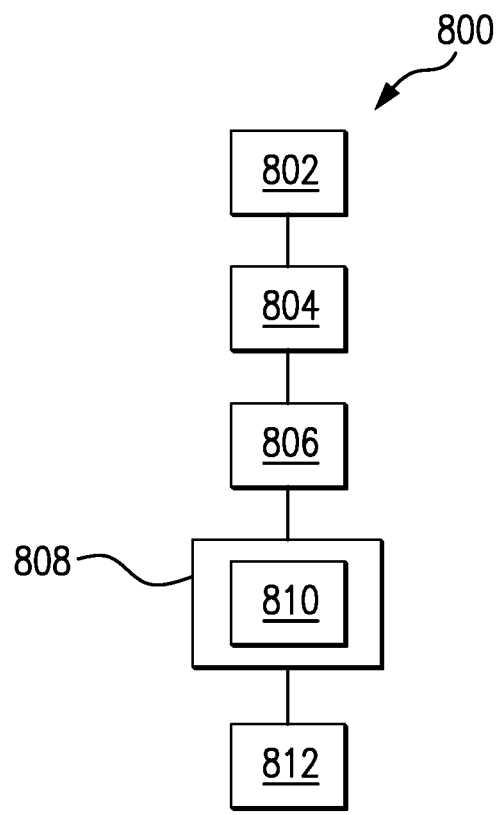
FIG. 10 is a flow chart schematically depicting an exemplary embodiment of a method for restricting flow in an ecology fuel return system in accordance with the present disclosure.

As shown in FIG. 10, a method 800 for restricting flow in an open ecology fuel return system, e.g. systems 600 and 700, includes recovering fuel from engine components, e.g. engine components 611 and 711, indicated schematically by box 802. Method 800 includes communicating the recovered fuel to an inlet of a fuel tank, e.g. inlet 612 or 712, indicated schematically by box 804. Method 800 includes pumping the recovered fuel from an outlet of the fuel tank, e.g. outlet 614 or 714, to an inlet of an engine, e.g. inlet 615 and 715, with an ejector pump, e.g. pump 604 or 704, when a float, e.g. float 606 or 706, within the tank unoccludes the outlet of the fuel tank, indicated schematically by box 806. Method 800 includes restricting fluid flow from the tank outlet to the ejector pump with at least one of a flow restricting orifice or a hydraulic fuse, e.g. flow restricting orifice 608 or hydraulic fuse 708, downstream from the float and the tank outlet, indicated schematically by box 808. If the hydraulic fuse is being used, during a negative G event, method 800 includes activating the hydraulic fuse to restrict fluid flow, indicated schematically by box 810. During normal, positive G forces, for example, 1 G or greater, method 800 includes de-activating the hydraulic fuse to allow unrestricted fluid flow, indicated schematically by box 812.

The methods and systems of the present disclosure, as described above and shown in the drawings, provide for ecology fuel return systems with superior properties including reduced air ingestion into the engine's main fuel lines during negative G events. Reduced airflow into the engine's main fuel lines, in turn, can reduce fuel coking and plugging of fuel injectors and nozzles, which increases the possibility that the engine will operate at full power and efficiency, reduce fuel pump degradation, reduce the possibility of fuel cavitation in the main fuel pump, and reduce the possibility of in-flight engine shut-downs. Systems and methods described herein also protect the fuel system from failure of the shutoff valve in other scenarios, outside of negative G events. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A shut-off valve system comprising:
   a tank having an inlet and an outlet with a flow path defined therebetween;
   a float within the tank that occludes the tank outlet and abuts an opening at a first fluid level under positive G forces and unoccludes the tank outlet at a second fluid level under positive G forces; and
   a flow restricting orifice downstream of the float and the tank outlet to restrict fluid communication between the tank outlet and an ejector pump, wherein the flow restricting orifice is in an ejector flow path defined between the tank outlet and an inlet of the ejector pump, wherein the flow restricting orifice is upstream from the inlet of the ejector pump, wherein a portion of the ejector flow path is downstream from the flow restricting orifice and upstream from the inlet of the ejector pump, and wherein the system is free from any biasing members between the opening and the ejector pump.

2. A shut-off valve system as recited in claim 1, wherein a flow direction through the ejector flow path under positive G forces is in the positive G direction.

3. A shut-off valve system as recited in claim 1, wherein a flow direction of the flow path under positive G forces is in the positive G direction.

4. An ecology fuel return system, comprising:
   a tank having an inlet and an outlet defining a flow path therebetween, wherein the inlet is in fluid communication with components of an engine for recovery of fuel;
   an ejector pump in fluid communication with the outlet of the tank to pump fuel from the tank to a fuel pump inlet of an engine;
   a float within the tank that occludes the tank outlet and abuts an opening at a first fluid level under positive G forces and unoccludes the tank outlet at a second fluid level under positive G forces; and
   a flow restricting orifice downstream of the float and the tank outlet to restrict fluid communication between the tank outlet and the ejector pump, wherein the flow restricting orifice is in an ejector flow path defined between the tank outlet and an inlet of the ejector pump, wherein the flow restricting orifice is upstream from the inlet of the ejector pump, wherein a portion of the ejector flow path is downstream from the flow restricting orifice and upstream from the inlet of the ejector pump, and wherein the system is free from any biasing members between the opening and the ejector pump.

5. An ecology fuel return system as recited in claim 4, wherein a flow direction through the ejector flow path under positive G forces is in the positive G direction.

6. An ecology fuel return system as recited in claim 4, wherein a flow direction of the flow path under positive G forces is in the positive G direction.

7. A method for restricting flow in an ecology fuel return system, comprising:
   recovering fuel from engine components;
   communicating the recovered fuel to an inlet of a fuel tank;
   pumping the recovered fuel from an outlet of the fuel tank to an inlet of an engine with an ejector pump when a float within the tank unoccludes the outlet of the fuel tank, wherein the float is configured and adapted to abut an opening at a first fluid level under positive G forces; and
   restricting fluid flow from the tank outlet to the ejector pump with a flow restricting orifice downstream from the float and the tank outlet, wherein the flow restricting orifice is in an ejector flow path defined between the tank outlet and an inlet of the ejector pump, wherein the flow restricting orifice is upstream from the inlet of the ejector pump, wherein a portion of the ejector flow path is downstream from the flow restricting orifice and upstream from the inlet of the ejector pump, and wherein the system is free from any biasing members between the opening and the ejector pump.

* * * * *